United States Patent [19]

Nilsson et al.

[11] Patent Number: 5,755,292
[45] Date of Patent: May 26, 1998

[54] PRESSURE MEDIUM OPERATED IMPACT MECHANISM

[76] Inventors: Göran Nilsson, P.O. Box 61, Sandarne S-820 20; Kjell Edström, Åsbäcksgatan 43, Söderhamn S-826 31; Roland Berg, PL 1985, Bergvik S-820 23, all of Sweden

[21] Appl. No.: 867,648

[22] PCT Filed: Nov. 9, 1993

[86] PCT No.: PCT/SE93/00943

§ 371 Date: Jul. 7, 1995

§ 102(e) Date: Jul. 7, 1995

[87] PCT Pub. No.: WO94/11160

PCT Pub. Date: May 26, 1994

Related U.S. Application Data

[63] Continuation of Ser. No. 433,407, Jul. 7, 1995, abandoned.

[30] Foreign Application Priority Data

Nov. 18, 1992 [SE] Sweden .................. 9203456

[51] Int. Cl.⁶ .......................................... B25D 9/00
[52] U.S. Cl. ..................... 173/13; 173/121; 173/204
[58] Field of Search ........................ 173/13, 17, 121, 173/204, 211

[56] References Cited

U.S. PATENT DOCUMENTS

| | | | |
|---|---|---|---|
| 2,580,158 | 12/1951 | Dean | 173/13 |
| 3,273,657 | 9/1966 | Williams et al. | 173/121 |
| 3,367,428 | 2/1968 | Conrad | 173/121 X |
| 3,802,516 | 4/1974 | Speicher | 173/204 X |
| 4,605,073 | 8/1986 | Nilsson et al. | 173/204 X |
| 4,903,784 | 2/1990 | Glaser | 173/121 X |

FOREIGN PATENT DOCUMENTS

| | | |
|---|---|---|
| 389697 | 11/1976 | Sweden . |
| 406875 | 3/1979 | Sweden . |
| 416901 | 2/1981 | Sweden . |
| 428439 | 7/1983 | Sweden . |
| 9200710 | 9/1993 | Sweden . |

*Primary Examiner*—Scott A. Smith
*Attorney, Agent, or Firm*—Jacobson, Price, Holman & Stern, PLLC

[57] ABSTRACT

A pressure medium operated reciprocating impact mechanism has at least one working member (7) and at least one stop member (15), which are axially movable with respect to each other, and a working chamber (22) for pressure medium is arranged in at least one of them and is opened towards the other member. One of the members has an opening (39) emerging into the working chamber for feeding pressure medium to the working chamber. The impact mechanism comprises an arrangement (21) for sealing the working chamber in the position in which the members are brought most together and allow pressure medium to escape out of the working chamber when a predetermined relative position of the members is reached during their movement apart. Furthermore, the impact mechanism comprises members (34, 35, 36) adapted to be actuated by the relative movement of the stop member and the working member and by this actuation during the movement of these members apart arrive to a state in which they obstruct the supply of compressed medium to the chamber and allow the supply during the movement of these members towards each other.

9 Claims, 2 Drawing Sheets

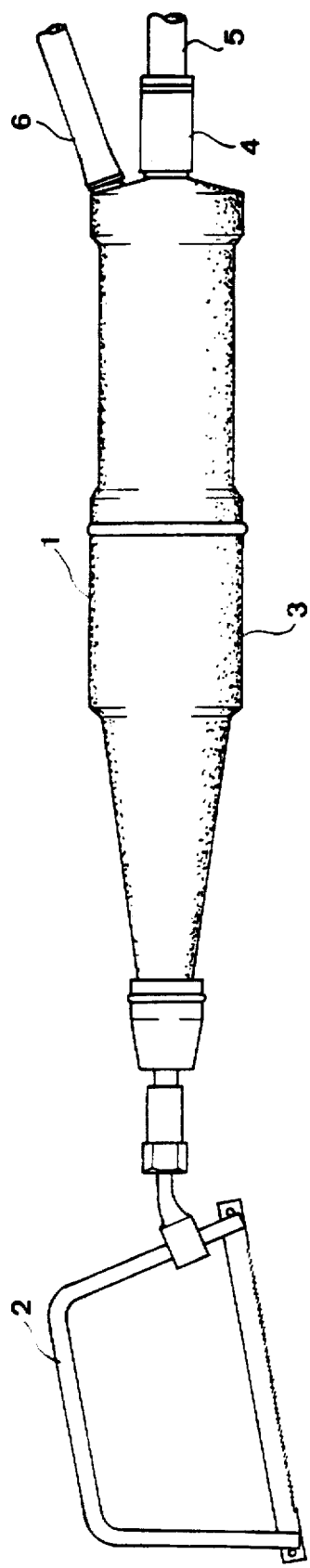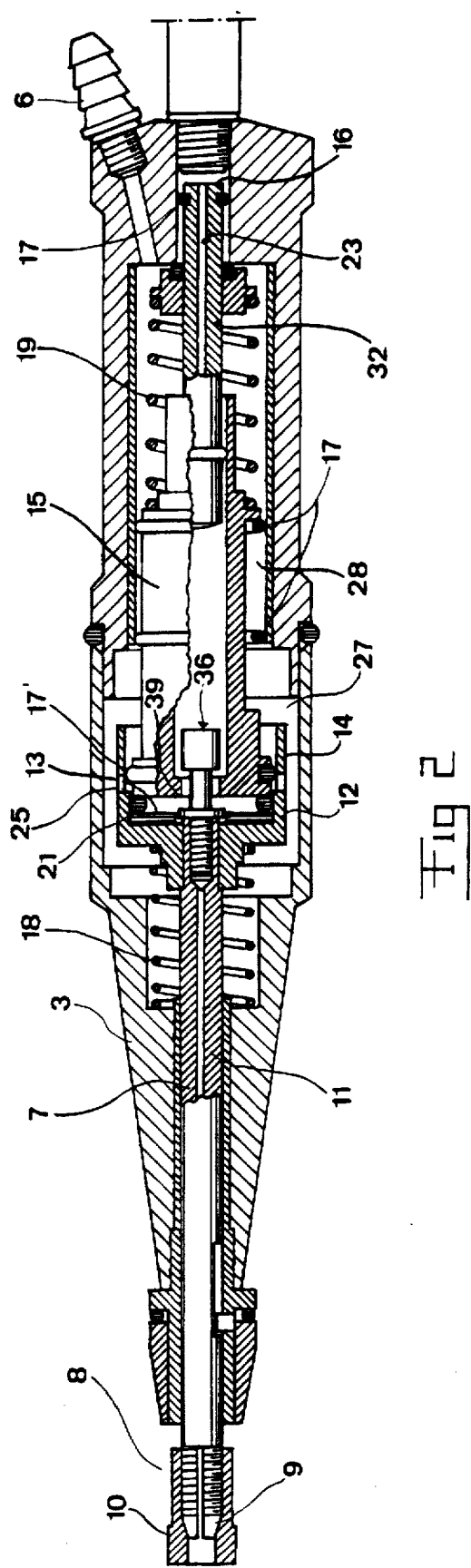

PRESSURE MEDIUM OPERATED IMPACT MECHANISM

This is a Continuation of application Ser. No. 08/433,407, filed Jul. 7, 1995 which was abandoned upon the filing hereof; which in turn is a nationalization of PCT/SE93/00943 filed Nov. 9, 1993, now abandoned.

FIELD OF THE INVENTION AND PRIOR ART

The present invention relates to a pressure medium operated reciprocating impact mechanism.

BACKGROUND OF THE INVENTION

Impact mechanisms of this type may be used for pressure medium operated devices working by a reciprocating movement of most various types and sizes and widely different ranges of size and frequency of the impact movement or stroke. Devices for driving in objects, such as poles and tongues, for drilling, chiselling, engraving, hammering, vibrating screens, feed shoes and similar devices as well as compacting ballast masses etc. may be mentioned as examples. Another common field of use is as a slag hacker.

Impact mechanisms of this kind are known for example through the Swedish patents 7503970-1 and 7603252-3 of the applicants as well as the Swedish patent application 9200710-3 also belonging to the applicants. Especially the impact mechanism according to the last mentioned patent application functions well, since it is distinguished from both mechanisms according to said Swedish patents by a length of the stroke being substantially exactly definable and this length is substantially independent of the pressure of the medium in question and does not vary by fluctuations thereof. Despite this advantage of the impact mechanisms according to said Swedish patent application it has as well as the other impact mechanisms already known of the type mentioned in the introduction, the disadvantage that it consumes comparatively a lot of compressed air when in operation.

The use of compressed air as a pressure medium will in the following be described by way of example, but the invention as well as the inventional task comprise the use of any pressure medium whatsoever, for example, hydraulic fluid, for operating an impact mechanism of this kind.

The comparatively high consumption of compressed air of the impact mechanisms already known of this type causes several inconveniences. Firstly, it is comparatively costly to generate compressed air by compressors, since these have a comparatively high energy consumption per unit of time. Secondly, the power, i.e. in practice the size, of the compressor needed so as to provide a certain impact mechanism with compressed air depends on the compressed air consumption per unit of time required for the proper operation of this impact mechanism. This means in its turn that an unnecessarily high consumption of compressed air implies the use of compressors having an unnecessarily high power and which accordingly are more expensive as well as heavier, and by that more difficult to move, than the compressors having a lower power.

SUMMARY OF THE INVENTION

The object of the present invention is to provide an impact mechanism of the type mentioned in the introduction, which finds a remedy to the inconveniences mentioned above of such impact mechanisms already known by having a considerably lower consumption of pressure medium than those which do not in any way waive the operation ability or reduce the working power obtained by the working member of the impact mechanism.

This object is in accordance with the invention obtained by providing an impact mechanism of the type mentioned in the introduction with means adapted to be actuated, i.e. influenced, by the relatives movement of the working member and the stop member and by this actuation during the separation movement of these members arrive to a state in which they obstruct the opening and interrupt the feed of pressure medium to the working chamber and during the movement of these members towards each other leave this state and allow pressure medium to be fed to the working chamber through the opening.

Thanks to the existence of said means in the impact mechanism according to the invention, whereby the supply of pressure medium to the working chamber is interrupted during the separation movement of the working member and the stop member and is established again during the movement of these members towards each other, the consumption of pressure medium of the impact mechanism may be reduced in an astonishingly high degree with respect to an identical impact mechanism missing said means. Thus, the invention is based on the understanding, that in the impact mechanisms already known pressure medium is supplied to the working chamber also when there is not the slightest need of such a pressure medium supply with respect to the operation of the impact mechanism, and that it is possible to shut off this pressure medium supply during a part of the relative movement of the stop and working members without detrimentally affecting the operation of the impact mechanism. When the stop and working members move away from each other there is, starting from a certain relative position, no need for any further supply of pressure medium, but the amount of pressure medium already supplied to the working chamber and the forces of inertia of the two members moving away from each other are sufficient to make these members continue their movement apart to a desired relative end position, without any further supply of pressure medium. There is neither any need of supply of pressure medium to said working chamber until the stop and working members starting from this relative position have moved a certain distance towards each other, because such a pressure medium supply leads to disappearance of great amounts of pressure medium entering into the working chamber directly out thereof as well as that the movement of the two members towards each other is disturbed to a certain extent. It has turned out that a compressed air operated impact mechanism according to the invention, which only differs from an impact mechanism already known by the addition of said means, has a compressed air consumption which is so low as a third of the consumption of the latter on supplying air with the same pressure to that impact mechanism and obtaining performance capacity being just as high as thereof. This leads to a considerably saving of energy costs for driving a compressor, also to saving of costs by the possibility to use a compressor having a considerable lower maximum power and which by that is smaller and less expensive. Additionally, a further advantage is automatically obtained, namely the stroke of the impact mechanism gets more distinct by the inventional construction thereof than in impact mechanisms already known.

According to a first preferred embodiment of the invention, said means are adapted to arrive to the state in which they obstruct the opening during the movement of said members away from each other at a relative position lying within said interval. It is by that positioning that no supply of pressure medium to the working chamber takes place during that part of the movement apart, in which the pressure medium supply would be totally ineffective, since the pressure medium would directly disappear out of the working chamber. It is a matter of course that said means should also be constructed to not allow any pressure medium supply to the working chamber again until the working and stop members during their later movement towards each other have at least arrived inside said interval, and according to a second preferred embodiment of the invention said means are adapted to cause obstruction and opening, respectively, when the members reach one and the same relative position, depending on in which direction the members move with respect to each other. This gives rise to a simple solution of the problem according to the invention at a very low cost and resulting in a greatly reduced pressure medium consumption as a consequence.

Said means comprise, according to a further preferred embodiment of the invention, an element connected to one of said members that does not include the opening, said element being adapted to follow said member in the movement thereof with respect to the member having said opening so as to obstruct and release the opening. A very simple control of the obstruction and the set free of the opening for supply of pressure medium of the impact mechanism according to the invention, is obtained in this way.

According to a still further embodiment of the invention a conduit for supply of pressure medium to the opening has in the last mentioned embodiment thereof also portions increasing the cross-section of the conduit in the upstream direction upstream of the opening, said element comprising a projection, which is arranged to extend through said opening and past the downstream limitation of said portions and which has a cross section allowing a flow of pressure medium to pass through the conduit and the opening past itself, as well as a second part connected to the end of the projection part located in the conduit and arranged to arrive to the downstream limitation of said portions during the movement of said members apart and obstruct the opening and leave said downstream limitation in the upstream direction during the movement of said members towards each other and by that allow supply of pressure medium to the working chamber through the opening. By designing the conduit for supply of pressure medium in this way and arranging such an element having a projecting part and a second part, a control of stopping and allowing, respectively, pressure medium supply to the working chamber of the impact mechanism may be obtained by very simple means, at a very low cost and with a high operation reliability.

The conduit for supply of pressure medium to the opening has in a development of the last mentioned embodiment of the invention a room with a larger cross-section than the second part upstream of said opening, a channel portion with a constant cross section interconnects the opening and said room, said projecting part having a smaller cross-section than the channel portion and the second part connected thereto having a cross-section corresponding to that of the channel portion, and the second part is adapted to interrupt and again allow pressure medium supply to the working chamber by entering into the channel portion by its downstream limitation during the movement of said members apart and leave the channel portion by its downstream limitation during the movement of these members towards each other, respectively. This embodiment enables realization of an obstruction of said opening for pressure medium supply to the working chamber during a comparatively considerable part of the relative movement of the stop and working members by very simple means, since this obstruction takes place as long as any portion of said second part is located in the channel portion, and the relative positions for obstructing and opening, respectively, the opening as well as ensuring that the opening, is not set free close to the relative position of said members in which they are moved furthest apart, may be very simply ensured by appropriately determining the dimensioning of the lengths of the projecting part, the second part and the channel portion in the direction of the movement of said members. Thus, it is essentially sufficient to have a pin with a head tightly displaceable into and out of the channel portion so as to realize the invention and obtain a very dramatic reduction of the pressure medium consumption with respect to an impact mechanism which would not have such a pin and channel portion.

Further advantages and preferred characteristics of the invention will appear from the following description and the other dependent claims.

BRIEF DESCRIPTION OF THE DRAWINGS

With reference to the appended drawings, below follows a description of a preferred embodiment of the invention cited as an example. In the drawings:

FIG. 1 is a side view of a tool provided with a pressure medium impact mechanism according to the invention, FIG. 2 is a longitudinally sectioned view of the tool shown in FIG. 1, which is enlarged compared with FIG. 1 and illustrates the construction of an impact mechanism according to a preferred embodiment of the invention.

DETAILED DESCRIPTION OF A PREFERRED EMBODIMENT OF THE INVENTION

Figure 3:
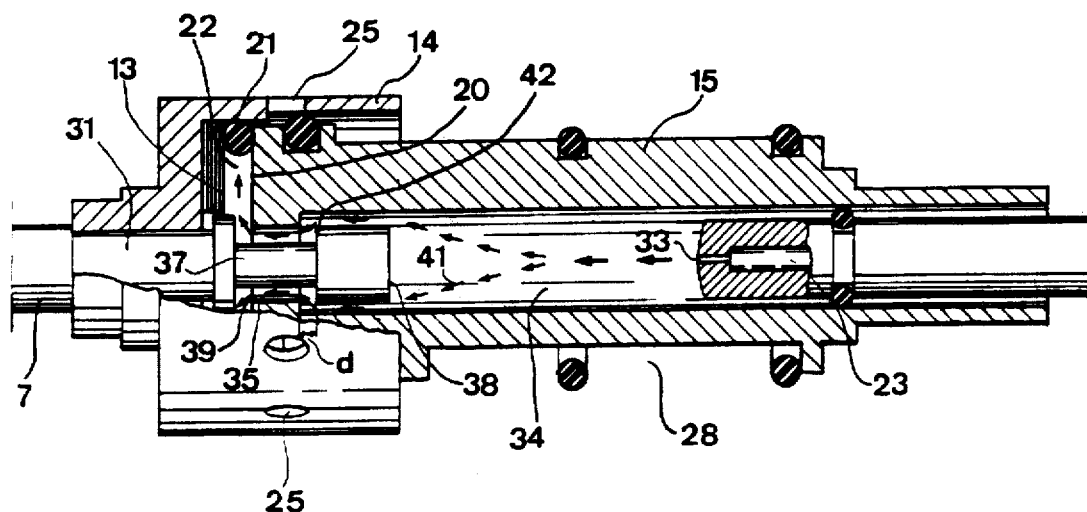
FIG. 3 is a partially sectioned partial view, which is enlarged with respect to FIGS. 1 and 2 and illustrates the construction of the working chamber and the means for interrupting and allowing pressure medium supply to the working chamber in the impact mechanism shown in FIG. 2 with the working member and the stop member in the position in which they are brought closest together.

The construction of the impact mechanism described hereinafter corresponds to that of the impact mechanism described in the Swedish patent application 9200710-3 except for the means for interrupting and allowing supply of compressed air to the working chamber.

Thus, a tool 1 is shown in FIG. 1, which in an exemplifying but not limiting way is provided with a saw 2, arranged to carry out a reciprocating movement thanks to the impact mechanism according to the invention arranged inside the casing 3 of the tool. The tool has at one end thereof a means 4 for connection of pressure medium, in this case air, through a hose 5 cut off in the figure for space reasons, and a conduit 6, preferably a flexible plastic hose, for leading consumed pressure medium away. Thanks to the fact that all pressure medium consumed is led through the conduit 6 away from the working place and which is not usually the case for this type of tool, and flows out in the region of the opposite end of the tool, the working condition is considerably improved for the person handling the tool by a reduction of the noise level and the whirling of dust. The pressure medium will hereafter, for the sake of simplicity, always be referred to as compressed air, although other types of pressure medium are of course also included. The hose 5 of the means 4 for connection of compressed air has preferably a feed valve, which makes it possible to open and shut-off the supply of compressed air to the impact mechanism by hand so as to prevent compressed air from being blown out to the conduit 6 when the tool is not at work.

With reference to FIG. 2, the construction of the impact mechanism according to the invention and arranged inside the tool 1 will now be described. The tool consists in a conventional way of a reciprocating working member 7 axially guided inside the casing 3, at one free end 8 of which different types of working tools, such as small saws, chisels and the like may be secured by inserting a small rod thereof between jaws 9 of the working member and after that tightening a nut 10. The working member 7 comprises at its opposite end a plate 12 secured by a screw to the elongated part 11 of the working member with a circular bottom 13 turned in the axial direction away from said end 8 and circumferential walls 14 with a cylinder casing shape projecting substantially perpendicularly therefrom in the same direction. A stop member or balance body 15 is arranged guidingly displaceable in the axial direction along an elongated body 32 received at the end 16 of the tool for supply of compressed air which extends into the room inside the circumferential wall 14 of the plate while being axially guided also through guide means in the form of O-rings 17, 17', which bear against the interior wall of the casing as well as the circumferential wall 14 (by ring 17'). The elongated body 32 is also guided with respect to the casing 3 through an O-ring 17.

The working member 7 and the stop member 15 are influenced in the direction towards each other by compression springs 18 and 19, respectively, each of which are adapted to act between axially directed surfaces of the casing and the respective member and in a rest position in absence of compressed air in the connection means 4, hold the stop member 15 with the axially directed front surfaces 20 thereof preloadedly bearing against a sealing member 21, in the form of a conventional elastic O-ring, bearing against said bottom 13.

A position in which the working member 7 and the stop member 15 are maximally brought together and which substantially corresponds to said rest position is illustrated in FIG. 3. A working chamber 22 sealed with respect to the exterior is in this position formed between said bottom 13 and the axial surfaces of the stop member turned towards said bottom. The sealing member 21 bears radially tightly against the circumferential wall 14 and axially seals the working chamber 22 between the stop member and the circumferential wall. The sealing member 21 is in this position somewhat deformed by the forces trying to press the working member and the stop member towards each other.

The body 32 has an inner channel 23, which at one end thereof by a small opening 33 emerges into a room 34, which in its turn emerges into the working chamber 22 through a short cannel portion 35 provided with a smaller diameter than the room, and at the other end thereof opens towards the means 4 for connection of compressed air. An element 36 is secured to the bottom of the working chamber 22, here by screwing, and adapted to follow the working member 7 in the movement thereof with respect to the stop member 15. The element 36 has in one piece extending axially in the direction of the relative movement of said members on one hand a cylindrical projecting part 37 extending from the working chamber and centrally into the channel portion 35 and on the other end a second end part 38 connected thereto, being concentrical to with the projecting part 37 and having a larger diameter than the projecting part 37.

The element 36 is preferably made out of one single piece, wherein the projecting part 37 has been formed by removal of material, so that the projecting part 37 is thinner than the end part 38. The diameter of the end part 38 corresponds with a very high accuracy to the inner diameter of the channel portion 35, so that the end part 38 may be received and moved axially in this channel portion while sealing the opening 39 of the channel portion with respect to the working chamber. The function of the means for restriction of the consumption of air formed by the element 36, the channel portion 35 and the room 34 will be described in detail later on. It is here only remarked that, when compressed air is supplied through the channel 23, into the room 34, past the end part 38, through the channel portion 35 and into the working chamber 22, in the position according to FIG. 2 and 3 (see the arrows in FIG. 3), this compressed air will press the working member 7 and the stop member 15 apart, so that the working member 7 moves forwardly against the action of the spring 18, at the same time as the stop member 25 moves in the opposite direction against the action of the spring 19.

The sealing member 21 is arranged to be freely movable in the working chamber and will during this movement apart be pressed by the compressed air regularly against the circumferential wall and at the same time axially against axial surfaces 20 of the stop member and by that follow the stop member in the movement thereof while maintaining the sealing of the working chamber 22 with respect to the exterior. The bottom 13 of the working chamber is preferably formed by a lubricated Teflon-washer, so that the sealing member may easily be released from the bottom on the movement of the working and stop members apart from each other. The circumferential wall 14 of the working chamber 22 is provided with circumferentially evenly distributed through bores 25 at a distance from the bottom 13 of the working chamber. When the sealing member (the O-ring 21), in said separating movement of the working member 7 and the stop member 15, with its radial bearing surface reaching the limitation 26 closest to the bottom 13, the radial sealing of the sealing member will be interrupted through said bores 25 (see the position according to FIG. 4), and the compressed air present in the working chamber 22 may flow past the sealing member 21 and out of the bores 25. A free room 27 is located between the plate and the casing outside the circumferential wall 14 of the plate. The compressed air may then move to the outlet 6 through said free room and because the stop member on one side is provided with a slot 28. This leads to only the two compression springs 18 and 19 acting upon the working member 7 and the stop member 15, respectively, so that the movement apart after a neglectable continuation is transformed to an opposite movement together. The sealing member 21 will then be pushed towards the bottom 13 of the working chamber and sealing this again, whereupon compressed air is supplied to the working chamber so created and presses the working and stop members apart, which then have reached the position according to FIG. 3, with the sealing member 21 deformed.

The circumferential wall 14 of the working chamber 22 has at the level of said limitations 26 of the bores 25 closest to said bottom 13 a concentric diameter increase, so that the circumferential wall has a wall portion 29 extending from the limitations 26 away from the bottom 13 and having a greater interior diameter than the wall portion 30 located closer to the bottom 13. When the sealing member 21 in the movement apart with the radial bearing surface thereof bearing against the circumferential wall reaches said limitation, the diameter increase of the circumferential wall will cause an interruption of the axial sealing between the circumferential wall and the stop member, so that compressed air present in the working chamber may axially flow past the sealing member 21 and out of the bores 25. Thanks to the cooperation of the bores 25 and the cross-section increase of the circumferential wall, a very abrupt, distinct and powerful or large opening of the previously sealed working member is obtained.

Figure 4:
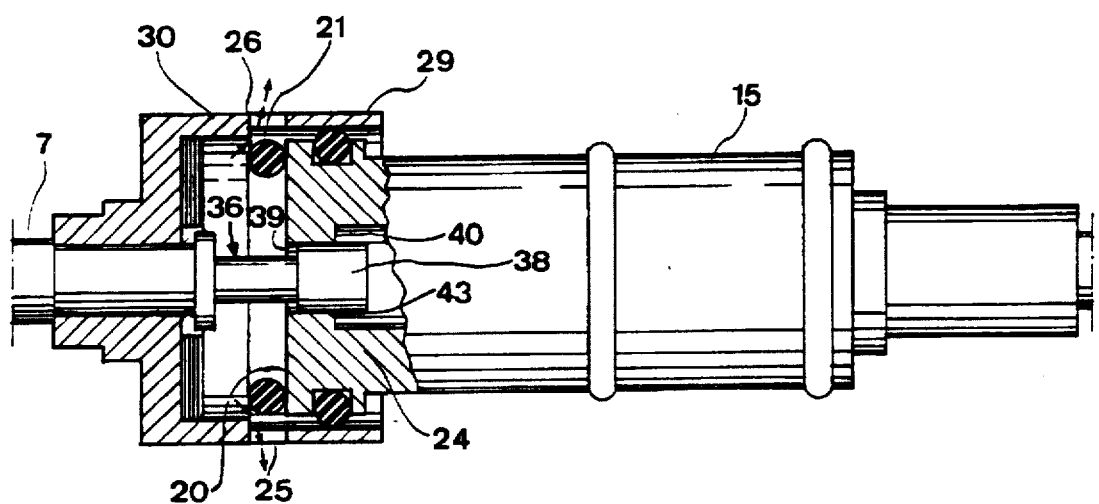
FIG. 4 is a view substantially corresponding to FIG. 3, but with the working member and the stop member moved apart into substantially the opposite extreme position.

The function of the important feature of the invention, namely the means that enables a considerable reduction of the consumption of compressed air with respect to the impact mechanism already known of this type, as for example the one according to SE 9200710-3, will now be described more in detail. Starting from a relative position of the working member 7 and the stop member 15 in which they are brought closest together, which corresponds to the position according to FIG. 3, these members are adapted to be pressed apart in the way described above by the possibility of supplying compressed air to the working chamber 22 through the opening 39 of the channel portion. The projecting part 37 of the element 36 extends in this position through the entire channel portion 35 and a distance d past in portions 40 increasing the cross-section, which form the downstream limitation for the room 34. Thanks to the fact that the projecting part 37 has a smaller diameter than the channel portion 35 and the end part 38 has a smaller diameter than the room 34, the compressed air will be able to flow past the end part 38 and the projecting part 37 and through the opening 39 into the working chamber 22, as indicated by the arrows 41. This will give rise to the working member 7 and the stop member 15 being pressed apart in the way described above, wherein after a movement of a distance corresponding to the length d the limitation edge 42 of the end part 38 located downstream will reach the limitation edge 43 of the channel portion 35 located upstream and obstruct this channel portion and by that interrupt the supply of compressed air to the working chamber 22. The working member 7 and the stop member 15 will from this obstruction point continue their movement away from each other, thanks to the overpressure created in the working chamber 22 as well as the inherent inertia of these members, while displacing the end part 38 in the channel portion 35, so that the entire cross-section of the latter will be filled out all the time and compressed air will be prevented from flowing therethrough. The relative movement of the working member 7 and the stop member 15 will continue in the way described above and slightly past that relative position, which allows the compressed air to escape through the openings 25 and through the slot 28 to the outlet 6. The position shown in FIG. 4 corresponds substantially to the extreme position. After reaching this extreme position the working members 7 and the stop member 15 move towards each other in the way described above, by which the end part 38 is displaced in the channel portion 35 to the right as seen in FIG. 4. When the downstream limitation 42 of the end part 38 reaches the upstream limitation 43 of the channel portion compressed air will again be allowed to flow into the channel portion and into the working chamber 22. Thus, this takes place when a movement length of d remains until the position shown in FIG. 3 in which said members are brought closest together is reached. Said distance d, i.e. the point for obstructing and opening the channel portion 35, respectively, is chosen by dimensioning the element 36 so that an exact supply of compressed air is used when it is needed and is otherwise cut-off. Accordingly, it is necessary that this distance d is so long that the members 7 and 15 after obstructing the channel portion 35 are able to reach the described end position, in which they are brought furthest apart, without any further supply of compressed air. The supply of compressed air to the working chamber 22 should in any case be interrupted before the compressed air is allowed to leave through the openings 25, and in the impact mechanism shown in the figures said obstruction preferably takes place during the first half of the relative movement of the members 7 and 15 from the position according to FIG. 3 to the other extreme position, and mostly preferred during the second quarter of this movement.

The consumption of the compressed air may, thanks to the arrangement according to the invention of the element 36 and the co-operation thereof with the channel portion 35 and the room 34, be radically reduced with respect to an impact mechanism with the same performance capacity but with none of these means for restricting the consumption of compressed air. More exactly the consumption of compressed air of the tool shown in the figures may be reduced from 64 l/min to 19 l/min with respect to the tool according to SE 9200710-3. For another tool, a slag hacker with an impact mechanism having considerably greater dimensions, the consumption of compressed air could by the arrangement of the means for restricting the consumption of compressed air in accordance with the invention, be reduced from 290 l/min to 100 l/min. Thus, the impact mechanism in question already known requires a consumption of compressed air which is essentially three times as high as the one for the impact mechanism according to the invention. The advantages obtained thereby have already been discussed.

The small opening 33 in the channel 23 may, in the impact mechanism shown in the drawings, thanks to the arrangement of the element 36 and the co-operation thereof with the channel portion 35 and the room 34, be given a diameter of 0.3 millimeters instead of 0.9 millimeters, but a sufficient amount of compressed air may in spite thereof be supplied to the working chamber 22 for enabling the desired function of the tool. The pressure in the conduit for feeding compressed air to the tool is then the same as in the case of a tool without the means for restricting the consumption of compressed air, in the case shown in the figures, of about 6 bars. It may be mentioned that the frequency of the tool shown in the figures will be about 75 strokes per second.

Furthermore, the reciprocating relative movement of the working member and the stop member becomes, thanks to the obstruction of the opening for supply of compressed air to the working chamber, which takes place in the impact mechanism of the invention, more distinct than before at the extreme points of this movement, so that the performance of the tool equipped with the impact mechanism according to the invention may also be improved with respect to the tools equipped with the impact mechanisms already known. When the position, in which the compressed air present in the working chamber is allowed to flow out of the working chamber, is reached during the movement of the members apart from each other, the change of direction of the relative movement in question will take place more distinctly, since no further compressed air is supplied to the working chamber, which otherwise could disturb the exactness of this change of direction to a certain extent. However, the return of the two members towards the position shown in FIG. 3 will above everything be considerably facilitated, since compressed air is not allowed to enter into the working chamber and create a resistance to this return movement as soon as the working chamber has been sealed, but this supply of compressed air may be started in a relative position of said members in which they are brought considerably closer together, and a more distinct, but still sufficiently damped retardation of the relative movement may take place.

The invention is of course not in any way restricted to the preferred embodiment described above, but several possibilities to modify it would be apparent to a man skilled in the art without departing from the basic idea of the invention, and only a few examples of such modifications will be mentioned hereinafter.

It would of course be possible to arrange the opening for feeding pressure medium to the working chamber in the working member instead of the stop member, as it is shown in the figures.

On the whole the means for obstructing and allowing, respectively, the supply of pressure medium to the working chamber by being actuated by the relative movement of the stop member and the working member, could be constructed in several different ways, wherein said means have to fulfill the function according to the invention without disturbing the relative movement of the two members in any way.

The cross-section shapes of the element, the channel portion, the projecting part, the end part, and the room of the means according to the invention for restricting the consumption of pressure medium could of course be different, for instance square, although the circular form probably would be the most preferred one for avoiding bitings.

The dimensioning of the element and the axial position of the different parts thereof could be varied according as desired so as to determine an appropriate position for the point for obstructing and allowing, respectively, the supply of compressed air to the working chamber through the opening.

The definition "obstruct the opening" comprises of course all cases in which a substantial supply of pressure medium through the opening is prevented, even if a channel portion is obstructed and this indirectly makes supply of pressure medium through the opening located downstream thereof impossible, as in the case shown in the figure. "Obstruct" comprises also the case in which there is a small leakage of pressure medium through said opening, although such a leakage would probably in practice always be unsuitable.

We claim:

1. A pressure medium operated reciprocating impact mechanism having at least one working member and at least one stop member the at least one working member and the at least one stop member are axially movable with respect to each other, and a working chamber for pressure medium arranged in at least one of the at least one working member and the at least one stop member and is open towards the other of the at least one working member and the at least one stop member, one of said members having an opening emerging into the working chamber for feeding pressure medium to the working chamber, said impact mechanism comprising an arrangement of said members adapted to seal the working chamber in relative positions of said members within an interval extending from a position in which said members are brought closest together to a predetermined position reached on movement apart of said members starting from said position caused by action of the pressure medium entering into the working chamber through said opening to allow the pressure medium to escape out of the working chamber in relative positions outside said interval, said arrangement of said members including means adapted to be actuated by relative movement of the working member and the stop member during movement of said members apart to arrive to a state in which said members obstruct the opening and interrupt the feed of pressure medium to the working chamber and during the movement of said members towards each other said members uncovered said opening and allow pressure medium to be fed to the working chamber through the opening, said opening being arranged in a second of said members and the working chamber being arranged in a first of said members, said means including an element connected to the other of said members, said element being arranged to follow the other member in the movement thereof with respect to the one member and with respect to the opening so as to obstruct and uncover the opening.

2. A mechanism according to claim 1, wherein a conduit for supplying pressure medium to the opening has an increased cross-sectional portion located upstream of the opening, and the element comprises a projecting part adapted to extend through said opening and past a downstream limitation of said portion having a cross section allowing a flow of pressure medium to pass through the conduit and the opening, as well as a second part connected to an end of the projecting part located in the conduit and arranged to arrive to the downstream limitation during movement of said members apart and obstruct the opening and move away from said downstream limitation in the upstream direction during movement of said members towards each other and to allow supply of pressure medium to the working chamber through the opening.

3. A mechanism according to claim 2, wherein the conduit for feeding pressure medium to the opening has a room with a larger cross-section that the second part.

4. A mechanism according to claim 3, wherein a channel portion with a constant cross-section interconnects the opening and said room, that the projecting part has a smaller cross-section than the channel portion and the second part connected thereto has a cross-section substantially corresponding to that of the channel portion, and the second part is adapted to interrupt and again allow pressure medium supply to the working chamber by moving the downstream limitation into said channel portion during the movement of said members apart and by moving away from said channel portion during the movement of said members towards each other, respectively.

5. A mechanism according to claim 4, wherein the projecting part and the second part are made out of one piece having two coaxial cylindrical portions with different diameters.

6. A mechanism according to claim 1, wherein said means are adapted to cause obstruction and opening, respectively, of the opening, when the members reach a same relative position, depending on in which direction the members are moving with respect to each other.

7. A mechanism according to claim 1, wherein said means are adapted to arrive to a position in which they obstruct the opening during the movement of the members apart when the members reach a relative position lying within said interval.

8. A mechanism according to claim 1, wherein the opening is arranged in the stop member.

9. A mechanism according to claim 1, wherein the first one of the members includes the working chamber, and that said arrangement comprises a sealing means arranged to, on movement of the working member and the stop member apart, starting from the position in which they are brought closest together caused by action of the pressure medium entering into the working chamber, to follow the second one of the members while moving axially along a circumferential wall of the working chamber, and at least a through hole arranged in the circumferential wall of the working chamber at a predetermined distance from a bottom of the working chamber directed substantially axially and towards the second member, said through hole being adapted to interrupt a radial sealing of the sealing means to the circumferential wall, when the sealing means reaches the limitation of said through hole closest to said bottom by a radial bearing against said circumferential wall on the movement of the working and stop members apart and to be connected to the working chamber for letting pressure medium out therefrom.

* * * * *